United States Patent
Yu et al.

(10) Patent No.: US 10,644,744 B2
(45) Date of Patent: May 5, 2020

(54) METHODS AND APPARATUS FOR ULTRA WIDEBAND MULTIUSER INTERFERENCE REDUCTION

(71) Applicant: Apple Inc., Cupertino, CA (US)

(72) Inventors: Xiaoming Yu, Cupertino, CA (US); Alejandro J. Marquez, Sunnyvale, CA (US); Indranil S. Sen, Fremont, CA (US); Peter M. Agboh, San Francisco, CA (US); Shang-Te Yang, San Jose, CA (US); Vusthla Sunil Reddy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/106,354

(22) Filed: Aug. 21, 2018

(65) Prior Publication Data

US 2020/0067565 A1 Feb. 27, 2020

(51) Int. Cl.
  *H04B 1/7103* (2011.01)
  *H04B 1/7163* (2011.01)
  *H04J 3/06* (2006.01)
  *H04B 7/06* (2006.01)
  *H04W 74/08* (2009.01)

(52) U.S. Cl.
  CPC ......... *H04B 1/7103* (2013.01); *H04B 1/7163* (2013.01); *H04B 1/71632* (2013.01); *H04B 1/71635* (2013.01); *H04B 7/06* (2013.01); *H04B 7/0613* (2013.01); *H04J 3/0635* (2013.01); *H04J 3/0658* (2013.01); *H04B 2201/7097* (2013.01); *H04W 74/0808* (2013.01)

(58) Field of Classification Search
CPC combination set(s) only.
See application file for complete search history.

(56) References Cited

U.S. PATENT DOCUMENTS

| 9,722,693 B2 * | 8/2017 | Sato ........................ H04B 7/26 |
| 2005/0025092 A1 * | 2/2005 | Morioka ............. H04W 74/002 370/328 |

(Continued)

FOREIGN PATENT DOCUMENTS

| EP | 1091506 A2 | 4/2001 |
| WO | WO2018044834 A1 | 3/2018 |

*Primary Examiner* — Linda Wong
(74) *Attorney, Agent, or Firm* — Kowert Hood Munyon Rankin and Goetzel PC; Jeffrey C. Hood; Matthew C. Washburn

(57) ABSTRACT

Methods and apparatuses are presented to reduce multiuser interference resulting from two or more overlapping ultra wideband (UWB) transmissions by randomizing the start time of packets and/or bursts within the packets. A random offset time may be generated for a packet, and transmission of the packet may be arbitrarily delayed by that random offset time, relative to an earlier time at which the packet is prepared for transmission. A random offset time may be generated for a pulse burst within a symbol of a packet, and transmission of the burst may be delayed by that random offset time, relative to a nominal transmission window within the symbol. The burst may therefore occupy a portion of a guard period following the nominal transmission window. Either procedure, or both procedures, may be used to reduce multiuser interference between two concurrently transmitted packets by randomizing overlap occurring between the bursts.

20 Claims, 9 Drawing Sheets

(56) References Cited

U.S. PATENT DOCUMENTS

| | | | |
|---|---|---|---|
| 2005/0030935 A1* | 2/2005 | Seisenberger | H04L 7/06 |
| | | | 370/350 |
| 2005/0036475 A1* | 2/2005 | Nishiyama | H04W 72/10 |
| | | | 370/347 |
| 2010/0246639 A1* | 9/2010 | Roh | H04B 1/7174 |
| | | | 375/138 |
| 2011/0038309 A1* | 2/2011 | Shi | H04L 25/00 |
| | | | 370/328 |
| 2012/0224534 A1* | 9/2012 | Kimura | H04W 28/06 |
| | | | 370/328 |
| 2013/0301682 A1* | 11/2013 | Sinsuan | H04B 1/7103 |
| | | | 375/141 |
| 2014/0241270 A1* | 8/2014 | Tohzaka | H04W 74/0808 |
| | | | 370/329 |
| 2015/0181547 A1* | 6/2015 | Dinan | H04W 52/146 |
| | | | 370/336 |
| 2015/0295733 A1* | 10/2015 | Annavajjala | H04L 25/0206 |
| | | | 375/260 |
| 2015/0326361 A1* | 11/2015 | Gerakoulis | H04L 5/026 |
| | | | 370/329 |
| 2017/0005741 A1 | 1/2017 | Wu | |
| 2017/0163461 A1* | 6/2017 | Baek | H04L 27/2613 |
| 2018/0332618 A1* | 11/2018 | Kakishima | H04B 7/0626 |

* cited by examiner

METHODS AND APPARATUS FOR ULTRA WIDEBAND MULTIUSER INTERFERENCE REDUCTION

TECHNICAL FIELD

The present application relates to wireless communication, including to techniques for reducing multiuser interference in pulse-based wireless communication.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost low-complexity wireless devices intended for stationary or nomadic deployment are also proliferating as part of the developing "Internet of Things". In other words, there is an increasingly wide range of desired device complexities, capabilities, traffic patterns, and other characteristics.

Ultra wideband (UWB) communications, such as the wireless communication protocol defined by IEEE 802.15.4, may provide low-cost, low-power, short-range communications over a very large bandwidth. For example, UWB may utilize a bandwidth in excess of 500 MHz. UWB may offer multiple advantages compared to narrower band radio communication technologies. For example, UWB communications may be less susceptible to multipath fading. Specifically, the short duration of UWB pulses makes them less susceptible to multipath effects compared to narrowband signals. As another example, UWB communications may operate with a very low (negative) signal-to-noise ratio (SNR) and exhibit excellent immunity to noise. Thus, UWB can easily co-exist with other narrowband and wideband systems. As yet another example, UWB communications may provide enhanced communication security because their signals can be buried below the noise floor of conventional receivers, due to their wide bandwidth and low SNR. This makes them difficult to detect by nefarious third-parties.

Because UWB was developed primarily as a low-power, short-range, low-throughput technology, previous implementations typically did not include robust solutions for avoiding multi-user interference. Accordingly, improvements in the field are desired.

SUMMARY

Embodiments are presented herein of, inter alia, systems, apparatuses, and methods for reducing multiuser interference in Ultra Wideband (UWB) communications or other pulse-based communications.

According to the techniques described herein, multiuser interference between two or more overlapping transmissions may be reduced by randomizing the start time of packets and/or bursts within the packets.

According to some embodiments, a wireless communication device may transmit a frame including a plurality of bursts, with each burst having a random time offset.

For example, the wireless communication device may generate a frame including a plurality of data bursts, wherein each data burst of the plurality of data bursts may be associated with a respective nominal transmission window followed by a respective nominal guard window. For each data burst of the plurality of data bursts, the wireless communication device may generate a respective random offset time having a value not greater than the length of the respective guard window. In some scenarios, for each data burst of the plurality of data bursts, the respective random offset time may have a value not greater than a predetermined fraction of the respective guard time. The wireless communication device may transmit the frame to a receiving device, wherein each data burst of the plurality of data bursts may be transmitted at a time offset by the respective offset time from the start of the respective nominal transmission window, such that transmission of the data burst is completed during the respective guard window.

In some scenarios, the random offsets may be known to the receiving device. For example, in some scenarios, generating the respective random offset may include executing a pseudorandom number generation algorithm known to both the wireless communication device and the receiving device. In some scenarios, generating the respective random offset may include selecting a value from a sequence of values known to both the wireless communication device and the receiving device. The sequence of values may be a sequence defined by a communication protocol implemented by the wireless communication device.

As another example, a wireless communication device may include at least one antenna and communication circuitry coupled to the at least one antenna. The communication circuitry may be configured to encode first payload data as a first burst of pulses within a first symbol. The first symbol may include a nominal transmit time window followed by a nominal guard time window. The communication circuitry may be further configured to generate a first random offset time having a value not greater than the length of the nominal guard time window. In some scenarios, the first random offset time may have a value not greater than a predetermined fraction of the length of the nominal guard time window. The communication circuitry may be further configured to transmit the first symbol. Transmitting the first symbol may include transmitting the first burst of pulses at a time that is offset by the first random offset time from a start time of the nominal transmit time window.

In some scenarios, the first burst of pulses may occupy a portion of the first nominal guard time window as a result of the offset.

In some scenarios, the communication circuitry may be further configured to transmit a second symbol. For example, the communication circuitry may be further configured to encode second payload data as a second burst of pulses within a second symbol including a nominal transmit time window followed by a nominal guard time window; generate a second random offset time having a value not greater than the length of the nominal guard time window of the second symbol, wherein the value of the second random offset time may be independent from the value of the first random offset time; and transmit the second symbol immediately following transmitting the first symbol, wherein transmitting the second symbol may include transmitting the second burst of pulses at a time that is offset by the second random offset time from a start time of the nominal transmit time window of the second symbol.

In some scenarios, the communication circuitry may be further configured to transmit a frame including a plurality of symbols, including the first symbol. Each symbol of the plurality of symbols may include a respective nominal transmit time window followed by a respective nominal guard time window, wherein each symbol may include a respective burst of pulses offset from the respective nominal transmit time window by a respective random offset time.

According to some embodiments, a wireless communication device may transmit one or more packets that are arbitrarily offset in time.

For example, a wireless communication device may generate a first packet, such that the generated first packet is prepared for transmission at a first time. The wireless communication device may generate a first random offset, and transmit the first packet at a second time that is after the first time by the first random offset.

In some scenarios, the first random offset may have a value not greater than one symbol length.

In some scenarios, the wireless communication device may perform the transmitting the first packet at the second time without performing a carrier-sense multiple access (CSMA) procedure.

In some scenarios, the wireless communication device may also transmit a second packet. For example, the wireless communication device may generate a second packet, such that the generated second packet is prepared for transmission at a third time; generate a second random offset that may be independent from the first random offset; and transmit the second packet at a fourth time that is after the third time by the second random offset.

In some scenarios, the wireless communication device may further receive a notification that the first packet was not successfully received, wherein generating the second packet may include generating a copy of the first packet for retransmission.

In some scenarios, the wireless communication device may generate a periodic series of packets at regular intervals, wherein the first packet is included in the periodic series of packets. In some such scenarios, the wireless communication device may further transmit each packet in the periodic series of packets at a respective time that is delayed by a respective random offset following generation of the packet. In some such scenarios, the periodic series of packets may include audio packets.

In some scenarios, the wireless communication device may randomize both packet start time and burst start time.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
FIG. 1 illustrates an example wireless communication system, according to various exemplary embodiments described herein.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terminology

The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random-access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices including multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™ PlayStation Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" (also called "eNB") has the full breadth of its ordinary meaning, and at least includes a wireless communication station installed at a fixed location and used to communicate as part of a wireless cellular communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—Wireless Communication System

FIG. 1 illustrates an exemplary (and simplified) wireless communication system 100 in which aspects of this disclosure may be implemented. It is noted that the system of FIG. 1 is merely one example of a possible system, and embodiments of this disclosure may be implemented in any of various systems, as desired.

As shown, the exemplary wireless communication system includes a ("first") wireless device 102 in communication with another ("second") wireless device 104. The first wireless device 102 and the second wireless device 104 may communicate wirelessly using any of a variety of wireless communication techniques, potentially including ultra wideband (UWB) communication techniques.

As one possibility, the first wireless device 102 and the second wireless device 104 may communicate using ultra wideband (UWB) communication technology (e.g., IEEE 802.15.4 WPAN communication) and/or other techniques based on WPAN or WLAN wireless communication. One or both of the wireless device 102 and the wireless device 104 may also be capable of communicating via one or more additional wireless communication protocols, such as any of Bluetooth (BT), Bluetooth Low Energy (BLE), WLAN (e.g., IEEE 802.11/Wi-Fi), near field communication (NFC), GSM, UMTS (WCDMA, TDSCDMA), LTE, LTE-Advanced (LTE-A), NR, 3GPP2 CDMA2000 (e.g., 1×RTT, 1×EV-DO, HRPD, eHRPD), Wi-MAX, GPS, etc.

The wireless devices 102, 104 may be any of a variety of types of wireless device. As one possibility, one or more of the wireless devices 102, 104 may be a substantially portable wireless user equipment (UE) device, such as a smart phone, hand-held device, a wearable device, a tablet, a motor vehicle, or virtually any type of wireless device. As another possibility, one or more of the wireless devices 102, 104 may be a substantially stationary device, such as a set top box, media player (e.g., an audio or audiovisual device), gaming console, desktop computer, appliance, door, or any of a variety of other types of device.

Each of the wireless devices 102, 104 may include wireless communication circuitry configured to facilitate the performance of wireless communication, which may include various digital and/or analog radio frequency (RF) components, a processor that is configured to execute program instructions stored in memory, a programmable hardware element such as a field-programmable gate array (FPGA), and/or any of various other components. The wireless device 102 and/or the wireless device 104 may perform any of the method embodiments described herein, or any portion of any of the method embodiments described herein, using any or all of such components.

Each of the wireless devices 102, 104 may include one or more antennas for communicating using one or more wireless communication protocols. In some cases, one or more parts of a receive and/or transmit chain may be shared between multiple wireless communication standards; for example, a device might be configured to communicate using either of Bluetooth or UWB using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, a device may include separate transmit and/or receive chains (e.g., including separate antennas and other radio components) for each wireless communication protocol with which it is configured to communicate. As a further possibility, a device may include one or more radios or radio components which are shared between multiple wireless communication protocols, and one or more radios or radio components which are used exclusively by a single wireless communication protocol. For example, a device might include a shared radio for communicating using either of LTE or CDMA2000 1×RTT, and separate radios for communicating using each of UWB, Wi-Fi, and/or Bluetooth. Other configurations are also possible.

As previously noted, aspects of this disclosure may be implemented in conjunction with the wireless communication system of FIG. 1. For example, the wireless devices 102, 104 may communicate using one or more UWB wireless communication techniques or features described subsequently herein with respect to FIGS. 4-11. By utilizing such techniques (and/or other techniques described herein), the wireless device(s) may (at least according to some embodiments) be able to achieve reduction in multi-user interference.

Figure 2:
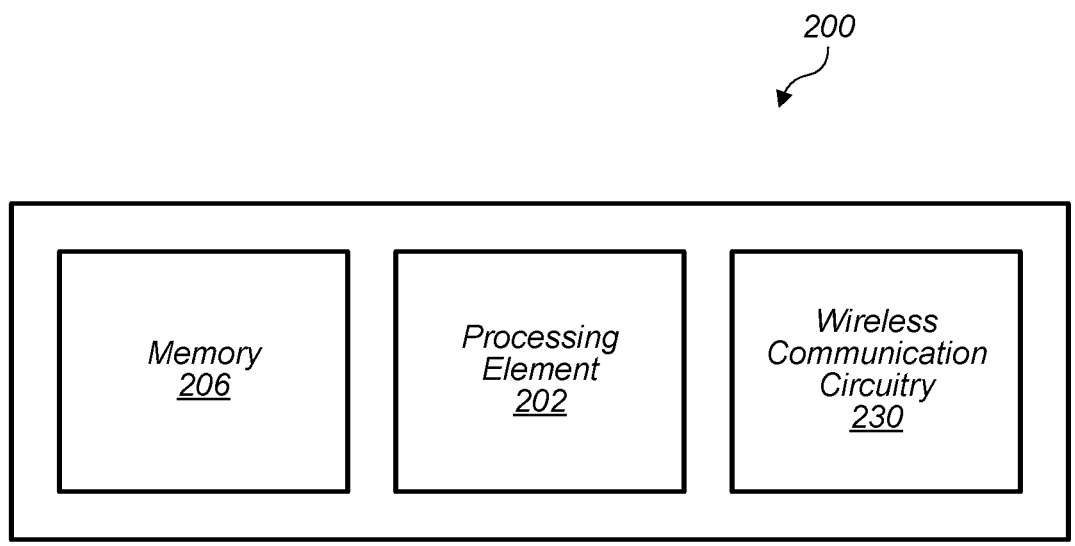
FIGS. 2-3 are block diagrams illustrating example wireless devices, according to various exemplary embodiments described herein.
Figure 3:
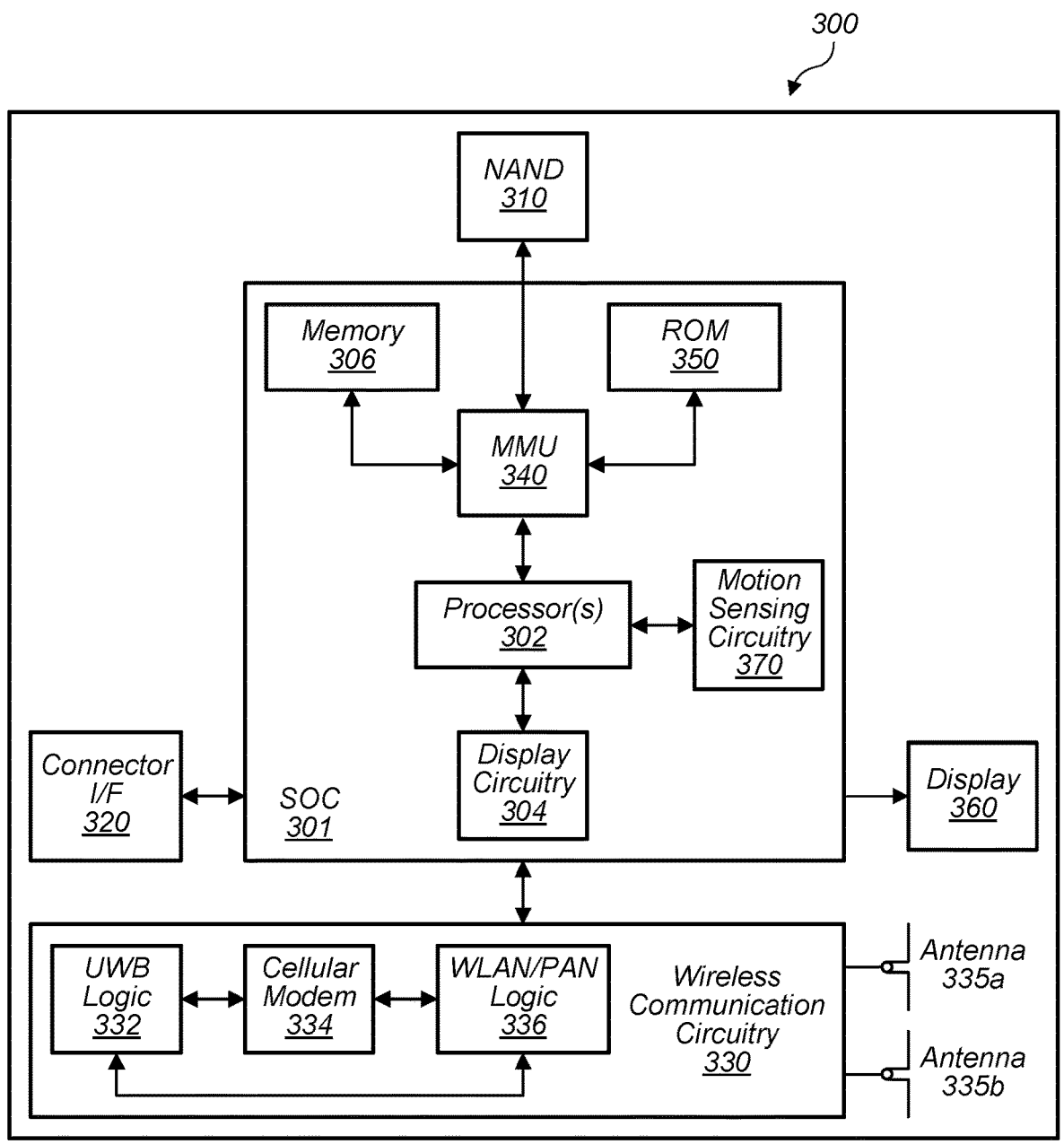

FIGS. 2-3—Exemplary Device Block Diagrams

FIG. 2 illustrates an exemplary wireless device 200 that may be configured for use in conjunction with various aspects of the present disclosure. The wireless device 200 may be one possible exemplary implementation of the device 102 illustrated in FIG. 1. The device 200 may be any of a variety of types of device and may be configured to perform any of a variety of types of functionality. The device 200 may be a substantially portable device or may be a substantially stationary device, potentially including any of a variety of types of device. The device 200 may be configured to perform one or more UWB wireless communication techniques or features, such as any of the techniques or features illustrated and/or described subsequently herein with respect to any or all of FIGS. 4-11.

As shown, the device 200 may include a processing element 202. The processing element may include or be coupled to one or more memory elements. For example, the device 200 may include one or more memory media (e.g., memory 206), which may include any of a variety of types of memory and may serve any of a variety of functions. For example, memory 206 could be RAM serving as a system memory for processing element 202. Other types and functions are also possible.

Additionally, the device 200 may include wireless communication circuitry 230. The wireless communication circuitry may include any of a variety of communication elements (e.g., antenna for wireless communication, analog and/or digital communication circuitry/controllers, etc.) and may enable the device to wirelessly communicate using one or more wireless communication protocols.

Note that in some cases, the wireless communication circuitry 230 may include its own processing element (e.g., a baseband processor), e.g., in addition to the processing element 202. For example, the processing element 202 might be an 'application processor' whose primary function may be to support application layer operations in the device 200, while the wireless communication circuitry 230 might be a 'baseband processor' whose primary function may be to support baseband layer operations (e.g., to facilitate wireless communication between the device 200 and other devices) in the device 200. In other words, in some cases the device 200 may include multiple processing elements (e.g., may be a multi-processor device). Other configurations (e.g., instead of or in addition to an application processor/baseband processor configuration) utilizing a multi-processor architecture are also possible.

The device 200 may additionally include any of a variety of other components (not shown) for implementing device functionality, depending on the intended functionality of the device 200, which may include further processing and/or memory elements (e.g., audio processing circuitry), one or more power supply elements (which may rely on battery power and/or an external power source) user interface elements (e.g., display, speaker, microphone, camera, keyboard, mouse, touchscreen, etc.), and/or any of various other components.

The components of the device 200, such as processing element 202, memory 206, and wireless communication circuitry 230, may be operatively coupled via one or more interconnection interfaces, which may include any of a variety of types of interface, possibly including a combination of multiple types of interface. As one example, a USB high-speed inter-chip (HSIC) interface may be provided for inter-chip communications between processing elements. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between various device components. Other types of interfaces (e.g., intra-chip interfaces for communication within processing element 202, peripheral interfaces for communication with peripheral components within or external to device 200, etc.) may also be provided as part of device 200.

FIG. 3 illustrates one possible block diagram of a wireless device 300, which may be one possible exemplary implementation of the device 102 illustrated in FIG. 1 and/or of the device 200 illustrated in FIG. 2. As shown, the wireless device 300 may include a system on chip (SOC) 301, which may include portions for various purposes. For example, as shown, the SOC 301 may include processor(s) 302 which may execute program instructions for the wireless device 300, and display circuitry 304 which may perform graphics processing and provide display signals to the display 360. The SOC 301 may also include motion sensing circuitry 370 which may detect motion of the wireless device 300, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash (e.g., NAND) memory 310). The MMU 340 may be configured to perform memory protection and page table translation or set up. In some embodiments, the MMU 340 may be included as a portion of the processor(s) 302.

As shown, the SOC 301 may be coupled to various other circuits of the wireless device 300. For example, the wireless device 300 may include various types of memory (e.g., including flash (e.g., NAND) memory 310), a connector interface 320 (e.g., for coupling to a computer system, dock, charging station, etc.), the display 360, and wireless communication circuitry 330 (e.g., for UWB, LTE, LTE-A, CDMA2000, Bluetooth, Wi-Fi, NFC, GPS, etc.).

The wireless device 300 may include at least one antenna, and in some embodiments multiple antennas 335a and 335b, for performing wireless communication with base stations and/or other devices. For example, the wireless device 300 may use antennas 335a and 335b to perform the wireless communication. As noted above, the wireless device 300 may in some embodiments be configured to communicate wirelessly using a plurality of wireless communication standards or radio access technologies (RATs).

The wireless communication circuitry 330 may include UWB Logic 332, a Cellular Modem 334, and additional WLAN/PAN Logic 336. The UWB Logic 332 is for enabling the wireless device 300 to perform UWB communications, e.g., according to 802.15.4 protocols or other UWB protocols. The WLAN/PAN Logic 336 is for enabling the wireless device 300 to perform other WLAN and/or PAN communications, such as Wi-Fi and/or Bluetooth communications. The cellular modem 334 may be capable of performing cellular communication according to one or more cellular communication technologies.

As described herein, wireless device 300 may include hardware and software components for implementing embodiments of this disclosure. For example, one or more components of the wireless communication circuitry 330 (e.g., UWB Logic 332) of the wireless device 300 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
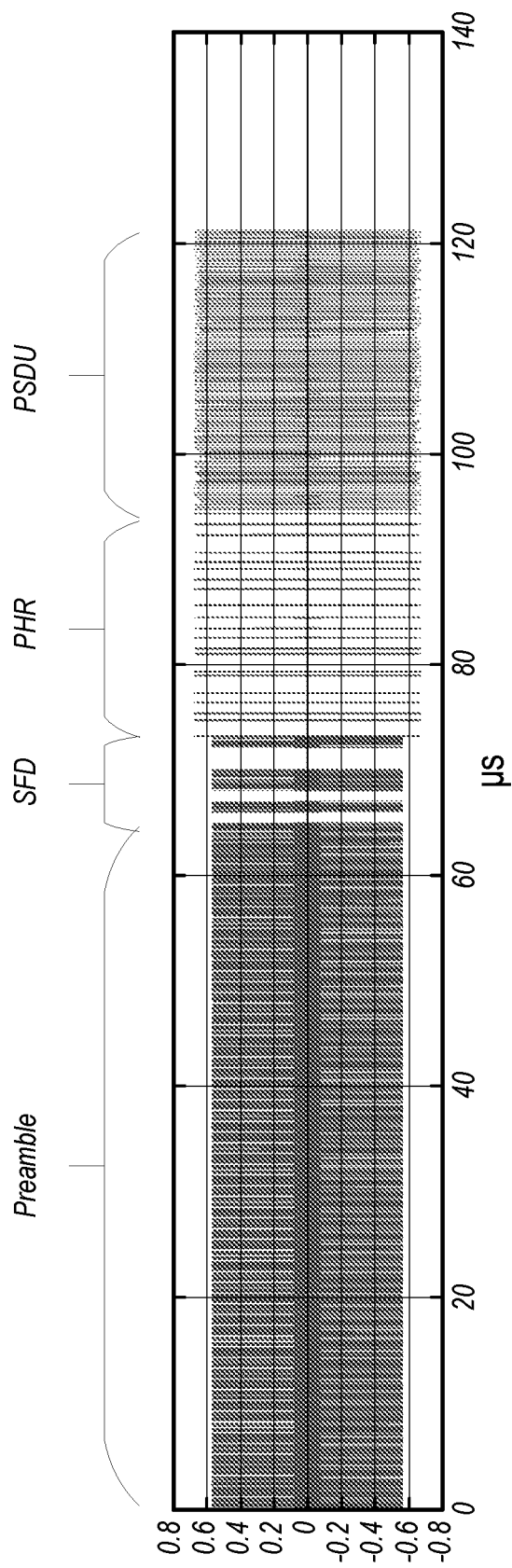
FIG. 4 illustrates a waveform representing an UWB frame that can be used to perform communications, according to various exemplary embodiments described herein.
Figure 5:
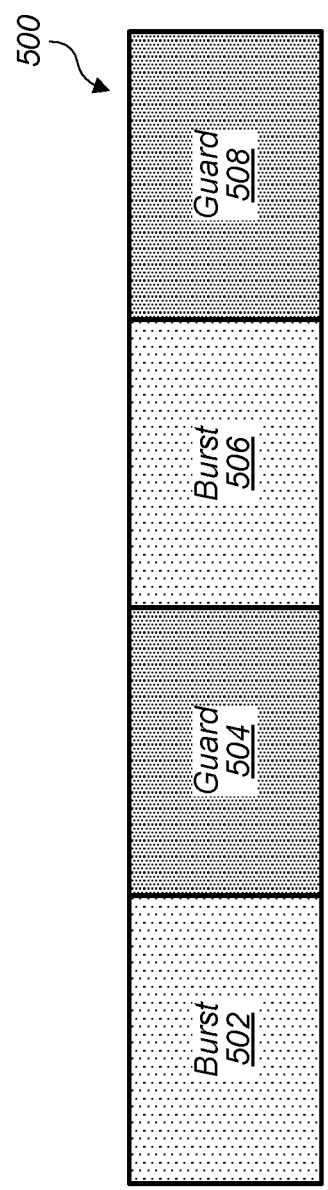
FIG. 5 illustrates an example symbol format for a symbol that may be included within the UWB frame of FIG. 4, according to various exemplary embodiments described herein.
Figure 6:
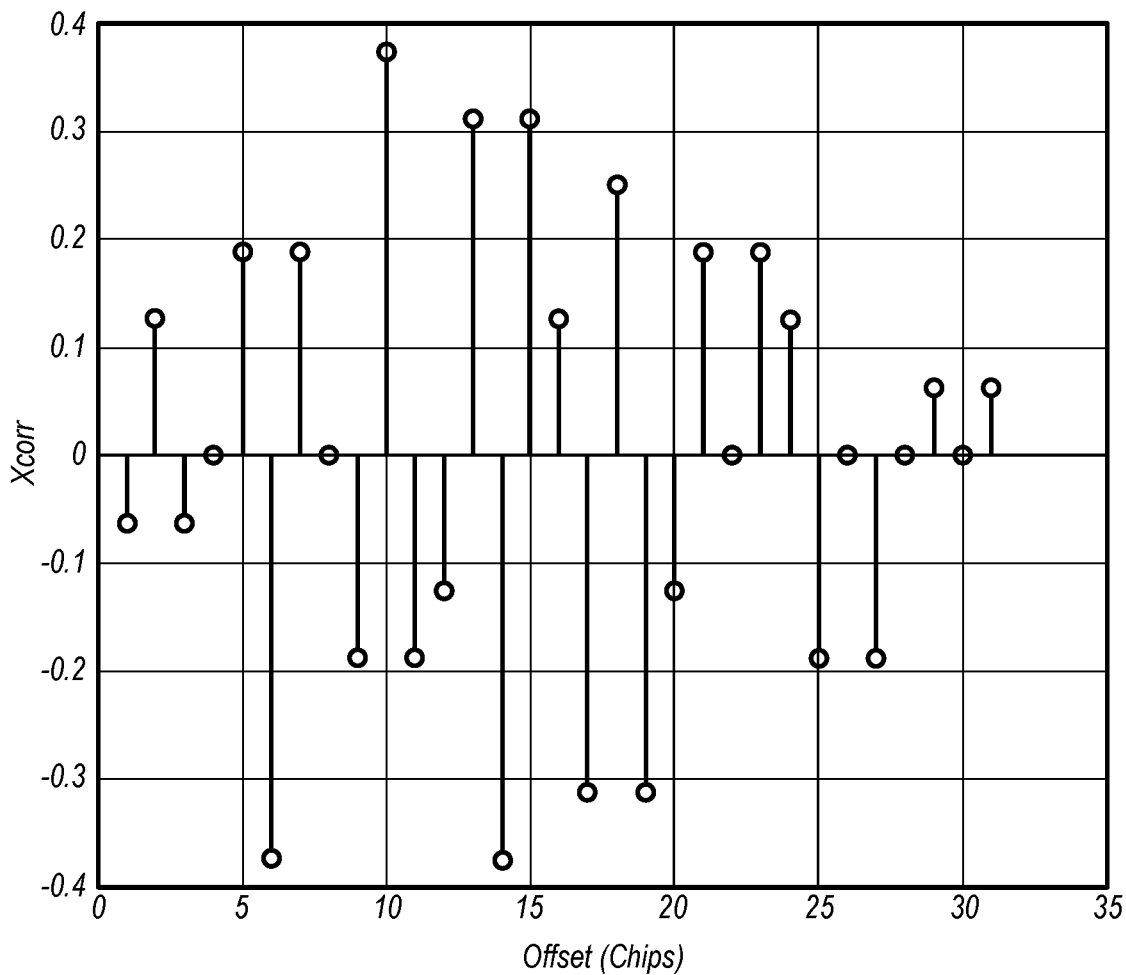
FIG. 6 illustrates normalized cross-correlation between a first symbol and a second, overlapping symbol transmitted at various offsets, according to various exemplary embodiments described herein.

FIGS. 4-6—UWB Frame Structure and Multiuser Interference

FIG. 4 illustrates a waveform representing an UWB frame, according to some embodiments. For example, the waveform of FIG. 4 may represent an UWB physical layer (PHY) frame defined by IEEE 802.15.4 HRP UWB PHY. The PHY frame may alternatively be referred to as a packet or, in some embodiments, a PHY protocol data unit (PPDU). The PHY frame may include various overhead portions, such as one or more preambles and one or more headers, as well as one or more payload data portions. As illustrated, the frame may include a preamble, a start-of-frame delimiter (SFD), a PHY header (PHR), and a PHY service data unit (PSDU). The preamble may contain a sequence or information for use in frame synchronization and/or ranging, and may be, e.g., 16 symbols in length. The SFD may serve to indicate the end of the preamble and the start of the substantive portions frame, and may be used to establish frame timing. According to some embodiments, the SFD may have a fixed value, e.g., 8 symbols in length. The PHR may contain information for decoding the PSDU, such as a size of the PSDU, and may be, e.g., 16 symbols. The PSDU may contain payload data. The PSDU may, according to some embodiments, be of variable size, such as 0-1209 symbols. Other sizes are also envisioned for each portion of the frame.

In UWB systems such as 802.15.4 HRP UWB PHY, multiple pulses may be used to modulate information bits onto symbols. According to some embodiments, a symbol may include one or more bursts of pulses, with each burst followed by a guard time. The guard times following the bursts are employed to reduce inter-symbol interference due to multipath delay spread.

FIG. 5 illustrates an example symbol format, according to some embodiments. For example, the symbol 500 illustrated in FIG. 5 may represent a data symbol, e.g., as included in the PSDU of FIG. 4. In various scenarios, the same symbol format or a different symbol format may be used in portions of the frame other than the PSDU.

As illustrated, the symbol 500 may include two burst periods: a first burst period 502 and a second burst period 506. In some scenarios, each burst period may include a data burst including a plurality of pulses—e.g., 16 pulses. In some scenarios, the pulses of a burst may represent a pseudorandom chip sequence to reduce multipath fading effects. In some scenarios, each symbol 500 may encode two data bits using burst position modulation and binary phase shift keying modulation (BPM-BPSK). For example, one data bit may specify one of the two burst periods (502 or 506) to carry a burst of pulses, while the other burst period may be unoccupied (e.g., no transmission is scheduled and/or transmitted). The other bit may modulate the phase of that burst. In some scenarios, other modulation schemes may be used, which may lead to differing symbol structures. For example, the symbol 500 may include other numbers of burst periods, other burst lengths, more than one occupied burst period, etc.

As illustrated, each burst period 502 and 506 may be followed (e.g., immediately) by a respective guard period: a first guard period 504, following the burst period 502, and a second guard period 508, following the burst period 506. No additional data is scheduled for transmission during the guard periods. In some scenarios, the guard periods 504 and 508 may be equal in length to the burst periods 502 and 506. For example, the burst period 502 may include 16 chips, and the symbol 500 may be 64 chips in total length. In some scenarios, a chip may have a length of 2 ns, e.g., when a bandwidth of 500 MHz is used. Other chip lengths are also envisioned.

In some scenarios, at least a portion of an UWB frame (e.g., the PSDU) may include a sequential series of symbols, e.g., such as the symbol 500 illustrated in FIG. 5. Thus, a series of burst periods may occur (or be scheduled to occur) at regular intervals throughout that portion of the frame. Guard periods may similarly occur (or be scheduled to occur) at regular intervals.

In some scenarios, the UWB frame may include support for one or more error correction schemes, e.g., forward error correction (FEC), such as Reed-Solomon and/or convolutional error correction. Various error correction schemes may be used to correct a finite number of errors in a received communication. For example, an error correction scheme may be capable of correcting errors up to a certain percentage of received data within the communication.

Multiuser interference may occur when multiple UWB wireless devices access the same wireless medium. Specifically, in some scenarios, UWB wireless devices may utilize the entire bandwidth, such that multiple wireless devices are transmitting within the same frequency band, e.g., without being limited to mutually-exclusive sub-bands. In such scenarios, each wireless device may cause interference to other wireless devices. Specifically, multiuser interference occurs when pulses transmitted by one wireless device overlap completely or partially in time with the pulses transmitted by one or more other wireless devices. Such multiuser interference may result in receiving incorrect data bits at the receiving wireless device. It is therefore desirable to reduce such multiuser interference.

In some scenarios (e.g., in some modes of operation), multiple UWB wireless devices may access the same wireless medium asynchronously, e.g., without transmission time slots being coordinated between the wireless devices. In such scenarios, frames transmitted by two wireless devices may start at different times, such that the frames overlap in time, but are offset from each other by a random time offset. Depending on the offset, the pulses transmitted by one wireless device may or may not overlap with the pulses transmitted by the other wireless device. For example, in some scenarios, the burst periods of a first frame may coincide with the guard periods of a second, overlapping frame. In such scenarios, multiuser interference may not occur. However, in other scenarios, the burst periods of the two frames may partially or completely overlap, leading to multiuser interference.

The degree of interference experienced is dependent upon the offset between the bursts of the two overlapping frames. In some scenarios, a data scrambling code sequence (e.g., a pseudorandom chip sequence) may be used to encode the data to minimize cross-correlation between signals. However, because the overlapping frames are not synchronized, the scrambling code may be imperfect. Thus, cross-correlation may still occur at some offset positions.

FIG. 6 illustrates normalized cross-correlation between a first symbol transmitted by a first wireless device and a second, overlapping symbol transmitted by a second wireless device at various offsets, according to some embodiments. Specifically, the normalized cross-correlation represents the cross-correlation divided by the autocorrelation.

At an offset of 0 chips, a 16-chip data burst of the first symbol is transmitted during a guard period of the second symbol. Thus, the normalized cross-correlation is 0. No multi-user interference would occur between the first and second wireless devices in such a scenario.

When the offset is shifted by one chirp, the 16-chip data burst of the first symbol overlaps a 16-chip data burst of the second symbol by one chip. As illustrated, the normalized cross-correlation is non-zero in this scenario, resulting in some multiuser interference. Each increasing offset value from 1 chip up to 16 chips represents an increasing degree of overlap between the two data bursts. At an offset of 16 chips, the data burst of the first symbol and the data burst of the second symbol overlap completely. Each increasing offset value from 17 chips up to 31 chips then represents a decreasing degree of overlap between the two data bursts. At an offset of 32 chips, the data burst of the first symbol is transmitted during the next guard period of the second symbol, such that the normalized cross-correlation is again 0.

As illustrated, the normalized cross-correlation value may vary significantly based on symbol offset, and may change noticeably with a shift of only one chip.

FIGS. 7-10—Burst Start Randomization

As illustrated in FIG. 6, the normalized cross-correlation value between symbols of two overlapping frames may vary significantly based on their relative offset, and may change noticeably with an offset shift of only one chip. In some scenarios, each of the two overlapping frames may include bursts at the same regular interval, e.g., where the two frames have symbols of the same length. Thus, each burst (or at least a significant plurality of bursts) of the first frame may have the same offset relative to respective bursts of the second, overlapping frame. If that offset has a high normalized cross-correlation, then the two frames may experience a rate of interference that exceeds the ability of the utilized error correction scheme to correct. By contrast, a different offset value may result in little or no multiuser interference, e.g., within the capacity of the utilized error correction scheme to correct. Thus, in some scenarios, reception of a frame may succeed or fail based significantly on the burst offset of that frame relative to another, overlapping frame.

To this end, the symbol structure of an UWB frame transmitted by a first wireless device may be varied so as to prevent a significant number of bursts within the frame from having the same offset relative to respective bursts of a second, overlapping frame transmitted by a second wireless device.

Figure 7:
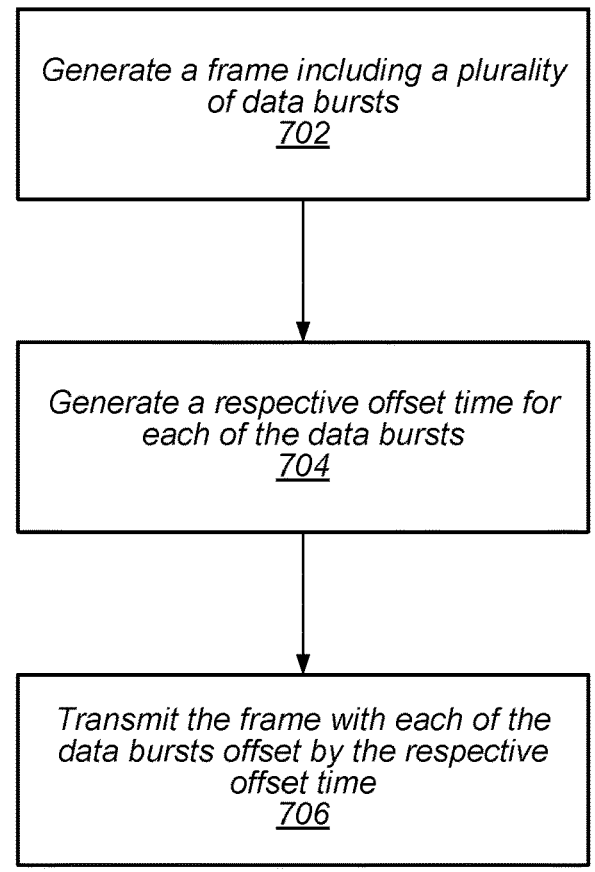
FIG. 7 shows a flow chart of an example implementation of burst start randomization, according to various exemplary embodiments described herein.

FIG. 7 shows a flow chart for a procedure to accomplish this goal when transmitting a frame, by randomizing burst start times within the frame, according to some embodiments. The procedure of FIG. 7 may be performed by a wireless communication device, e.g., such as the wireless device 102 (e.g., as may be further defined by the wireless device 200 and/or the wireless device 300). The wireless device 102 may be referred to as the transmitting wireless device 102.

At 702, the transmitting wireless device 102 may generate a frame including a plurality of data bursts. For example, the frame may be formatted as discussed above in connection with FIG. 4 and FIG. 5. Each data burst of the plurality of data bursts may be associated with a respective nominal transmission window. For example, each of the specified data bursts may be associated with a burst period, such as the burst period 502 or the burst period 506 of FIG. 5. Each of these burst periods may be scheduled to begin at a specific time within the frame. Thus, each burst may be associated with a respective nominal transmission window, e.g., defined as the scheduled time window of the respective burst period. These burst periods may, in some scenarios, be evenly or regularly spaced in time.

Each of the nominal transmission windows may be followed (e.g., immediately) by a respective guard window. For example, nominal guard windows may be defined as the scheduled time window of guard periods of a data symbol, such as the guard period 504 or the guard period 508 of FIG. 5.

At 704, the transmitting wireless device 102 may generate a respective offset time for each data burst of the plurality of data bursts. An offset time may be a value representing a number of time units of any convenient size or form, such as seconds (or portions thereof), clock cycles, symbols (or portions thereof), etc. In some scenarios, an offset time may be generated as a random offset time. As used herein, any reference to a "random" offset time or other value may include a "pseudorandom" value, as known in the art. An offset time may be generated in any manner that allows the offset to be known to both the transmitter and the receiver. For example, in some scenarios, generating an offset time may include executing an algorithm known to both the transmitting wireless device 102 and a remote receiving wireless device, such as the wireless device 104 of FIG. 1, to calculate an offset time—e.g., a pseudorandom offset time. In some scenarios, generating an offset time may include selecting a value from (or generating a value based on) a set of values known to both the transmitting wireless device 102 and the receiving wireless device 104. For example, the set of values may be a set of values stored by the wireless devices for some other purpose, such as, e.g., a scramble sequence defined by an applicable communications standard, such as 802.15.4.

At 706, the transmitting wireless device 102 may transmit the frame with each of the data bursts offset (e.g., delayed) by the respective offset time. For example, if the nominal transmission window (e.g., the burst period) associated with a given data burst begins at start time $T_N$ and the offset time for that data burst is $T_O$, then transmission of that data burst may begin at a time $T_T$, wherein $T_T=T_N+T_O$. During the time between $T_N$ and $T_T$, the transmitting wireless device 102 may not transmit any pulses.

The offset time generated for a given data burst may have a value not greater than (e.g., less than) the length of the respective guard window. Thus, delaying the data burst by the offset time may cause transmission of the data burst to be completed during the respective guard window.

Figure 8:
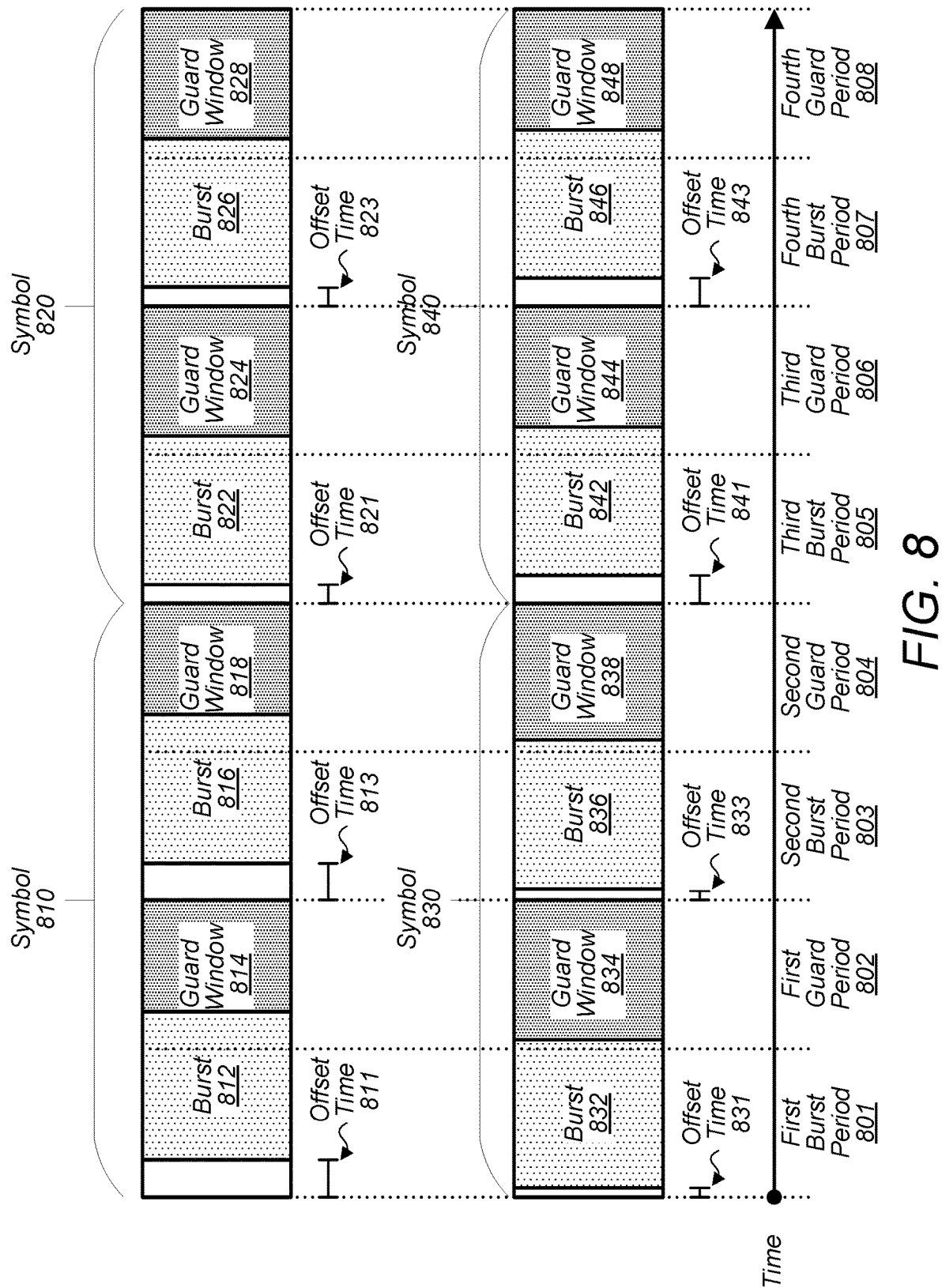
FIG. 8 illustrates two symbols in each of two frames transmitted according to the procedure of FIG. 7, according to various exemplary embodiments described herein.

FIG. 8 illustrates two symbols in each of two frames transmitted according to the procedure of FIG. 7, according to some embodiments. As illustrated by FIG. 8, symbol 810, transmitted by a first wireless device as part of a first frame, and symbol 830, transmitted by a second wireless device as part of a second frame, are transmitted (or received) with identical start times. Thus, without the procedure of FIG. 7, the signals may experience high cross-correlation, e.g. as illustrated in FIG. 6 with an offset of 16 chips, which may result in high multiuser interference. Furthermore, without the procedure of FIG. 7, each additional symbol within the first frame (such as symbol 820, as shown in FIG. 8) would be similarly aligned to respective symbols of the second frame (such as symbol 840, shown in FIG. 8), to the extent that the frames overlap in time. Thus, both frames may be received with high error rates. In some scenarios, the error rates for the frames may be so high as to prevent decoding of the frames.

However, each of the symbols illustrated in FIG. 8 has been transmitted according to the procedure of FIG. 7. Each of the symbol 810 and the symbol 830 includes a first burst period 801, a first guard period 802, a second burst period 803, and a second guard period 804. Similarly, each of the symbol 820 and the symbol 840 includes a third burst period 805, a third guard period 806, a fourth burst period 807, and a fourth guard period 808. However, each symbol includes a burst that is offset from its respective burst period.

For example, symbol 810 includes a burst 812. The burst 812 is associated with a nominal transmission window defined by the first burst period 801, followed by a guard window 814 defined by the first guard period 802. However, transmission of the burst 812 is delayed by offset time 811. Thus, transmission of the burst 812 begins after the start of the first burst period 801 and is completed after the end of the first burst period 801. Specifically, transmission of the burst period 812 is completed during the guard window 814.

As illustrated, symbol 810 further includes a burst 816. The burst 816 is associated with a nominal transmission window defined by the second burst period 803, followed by a guard window 818 defined by the second guard period 804. However, transmission of the burst 816 is delayed by offset time 813. Thus, transmission of the burst 816 begins after the start of the second burst period 803 and is completed after the end of the second burst period 803. Specifically, transmission of the burst 816 is completed during the guard window 818.

In some scenarios, the offset time 811 and the offset time 813 may be independently generated, and may thus have different (or independent) values. In other scenarios, such as the scenario illustrated in FIG. 8, one offset time may be generated for symbol 810, and may be used for both the offset time 811 and the offset time 813.

In some scenarios, the symbol 810 may include only a single burst, associated with either the first burst period 801 or the second burst period 803, e.g., in accordance with BPM-BPSK modulation. For example, the burst may be sent either as the burst 812 or as the burst 816, while no burst is sent in the other position. In such scenarios, a single offset time may be generated for the symbol 810, and may be used to offset the single burst, regardless of the position in which the burst is transmitted.

As illustrated, symbol 820 is transmitted with a format similar to that of symbol 810. For example, symbol 820 includes a burst 822. The burst 822 is associated with a nominal transmission window defined by the third burst period 805, followed by a guard window 824 defined by the third guard period 806. However, transmission of the burst 822 is delayed by offset time 821. Thus, transmission of the burst 822 begins after the start of the third burst period 805 and is completed after the end of the third burst period 805. Specifically, transmission of the burst period 822 is completed during the guard window 824.

As illustrated, symbol 820 further includes a burst 826. The burst 826 is associated with a nominal transmission window defined by the fourth burst period 807, followed by a guard window 828 defined by the fourth guard period 808. However, transmission of the burst 826 is delayed by offset time 823, which may be the same as or independent of offset time 821. Thus, transmission of the burst 826 begins after the start of the fourth burst period 807 and is completed after the end of the fourth burst period 807. Specifically, transmission of the burst 826 is completed during the guard window 828.

Like symbol 810, symbol 820 may, in some scenarios, include only one burst, e.g., in either the position of the burst 822 or the position of the burst 826.

The offset time(s) of the symbol 820 may be distinct (e.g., independently generated) relative to the offset time(s) of the symbol 810.

As illustrated, the symbols 830 and 840 have the same structure as symbols 810 and 820, which may be more briefly reiterated as follows. The symbol 830 includes a burst 832. The burst 832 is associated with a nominal transmission window defined by the first burst period 801, followed by a guard window 834 defined by the first guard period 802. However, transmission of the burst 832 is delayed by offset time 831.

As illustrated, symbol 830 further includes a burst 836. The burst 836 is associated with a nominal transmission window defined by the second burst period 803, followed by a guard window 838 defined by the second guard period 804. Transmission of the burst 836 is delayed by offset time 833.

The symbol 840 includes a burst 842. The burst 842 is associated with a nominal transmission window defined by the third burst period 805, followed by a guard window 844 defined by the third guard period 806. Transmission of the burst 842 is delayed by offset time 841.

As illustrated, symbol 840 further includes a burst 846. The burst 846 is associated with a nominal transmission window defined by the fourth burst period 807, followed by a guard window 848 defined by the fourth guard period 808. Transmission of the burst 846 is delayed by offset time 843, which may be the same as or independent of offset time 841.

The offset time(s) of the symbol 840 may be distinct (e.g., independently generated) relative to the offset time(s) of the symbol 830.

The offset time 831 may also be independent of the offset time 811. For example, each of the offset time 811 and the offset time 831 may be a randomly generated value. Thus, the burst 812 and the burst 832 are unlikely to be transmitted beginning at the same time. Specifically, the two bursts may have a random shift in time relative to each other. As can be seen from FIG. 6, such a random offset may result in cross-correlation becoming either better or worse.

However, subsequent symbols 820 and 840 also utilize offset times that are independent from each other, and are also independent of the offset times of the preceding symbols. Thus, the cross-correlation between the bursts of the two frames varies randomly from symbol to symbol. As a result, the cross-correlation between the bursts will average out over the course of the frames. In scenarios in which a data scrambling code sequence has been used to encode the data, it may be expected that the average cross-correlation should be low enough to allow for correction of any errors received due to cross-correlation between the two frames.

As may be seen from the illustration of FIG. 8, the offset time for each burst may theoretically be any value not greater than (e.g., less than) the following guard window. However, the more the burst impinges on the guard window, the more susceptible the burst becomes to multipath interference. Thus, in some scenarios, the offset times may have a lower maximum value, such as a predetermined fraction of the length of the guard window. For example, in some scenarios, the offset times may be selected from values ranging from 0 to 25% of the length of the guard window. For example, if each guard window of a symbol has a length of 16 chips, then the offset times may be any value from 0 to 4 chips. In other scenarios, the offset times may have a larger range, such as from 0 to ⅓, from 0 to 50%, or from 0 to 75% of the length of the guard window. Because multipath interference is a function of distance between the transmitter and the receiver, the range used for selecting offset times may, in some scenarios, be selected based on the distance over which transmitters is expected to operate for the given technology.

Figure 9:
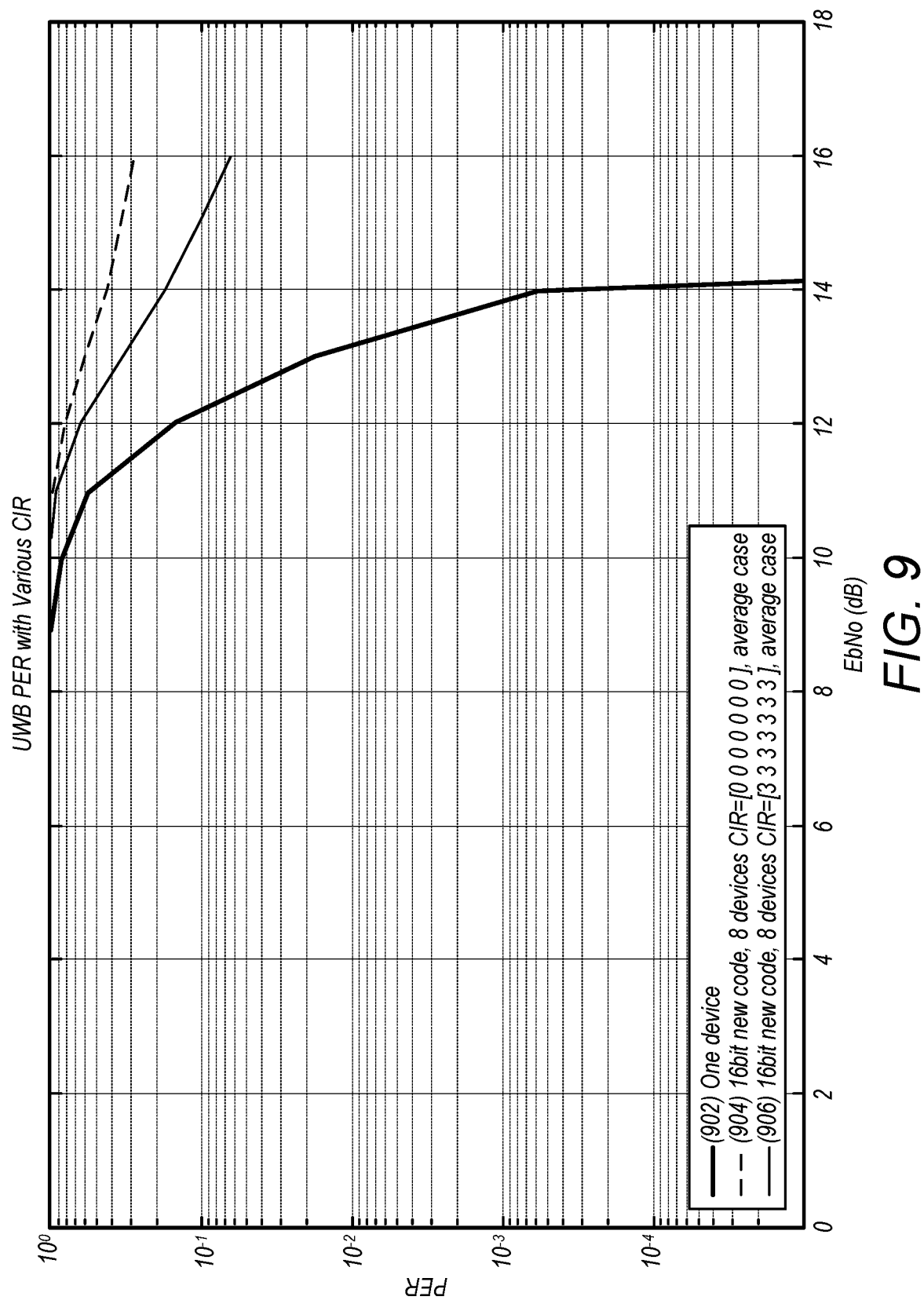
FIG. 9 shows a chart of simulation results illustrating packet error rates for UWB wireless devices at different SNRs, according to various exemplary embodiments described herein.
Figure 10:
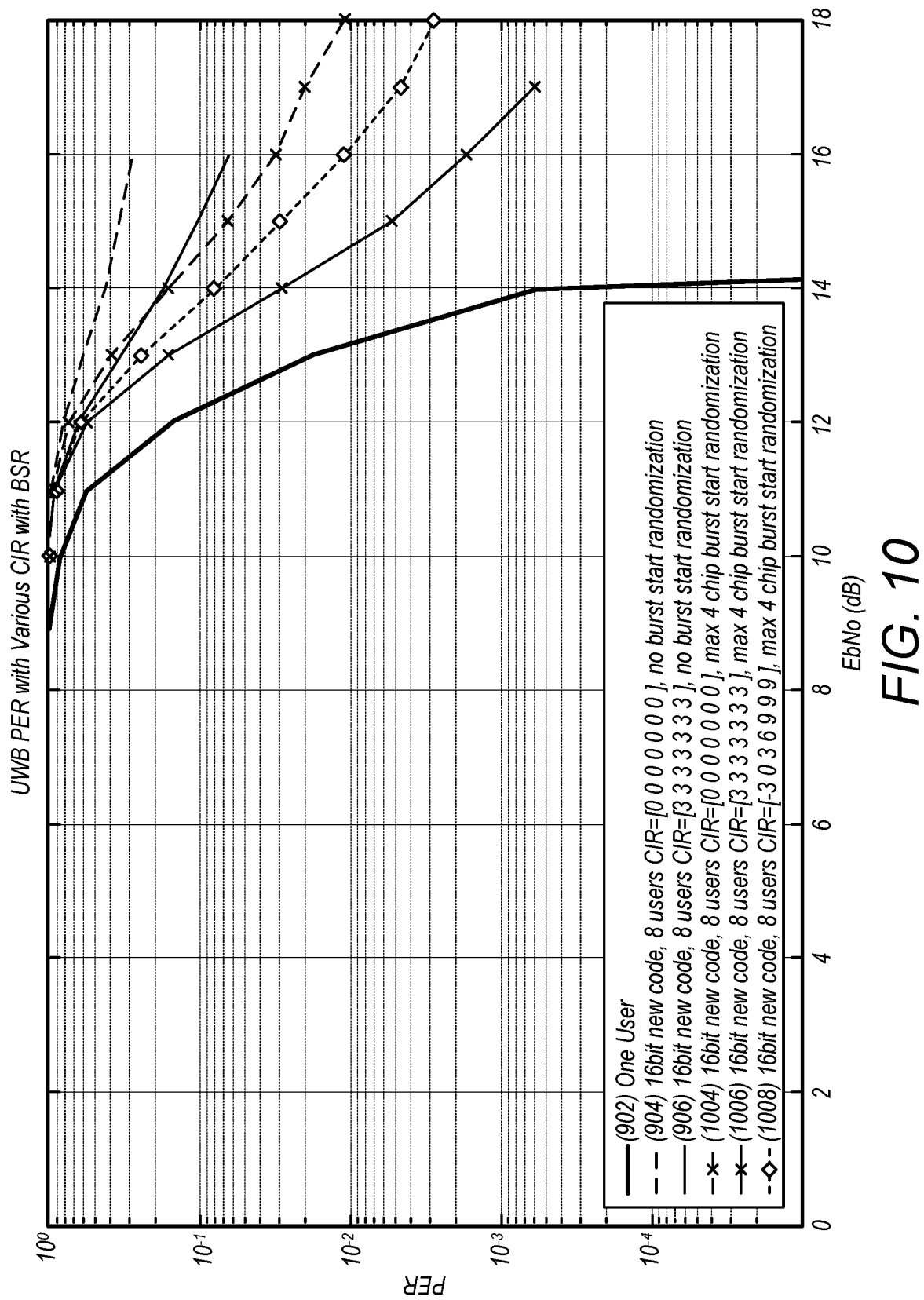
FIG. 10 shows a chart of simulation results illustrating packet error rates for UWB wireless devices implementing burst start randomization at different SNRs, according to various exemplary embodiments described herein.

The burst start randomization procedure of FIG. 7 may result in significantly lower SNR requirements for UWB multiple user communications. For example, in test scenarios utilizing an 802.15.4 system, improvement several dB may be achieved for an 8-user system. FIG. 9 and FIG. 10 illustrate such improvements.

FIG. 9 shows a chart of simulation results illustrating packet error rates for UWB wireless devices at different SNRs. Specifically, FIG. 9 shows simulation results within a traditional 802.15.4 HRP UWB PHY system (e.g., without the burst start randomization procedure disclosed herein). The curve 902 shows the packet error rate at a receiver for various SNR values for a single transmitting wireless device, e.g., as a baseline performance metric. Each of the curves 904 and 906 shows the packet error rate at a receiver attempting to receive a signal from one transmitting wireless device within a system including 8 transmitting wireless devices having different timing. Specifically, the curve 904 shows a scenario in which the channel impulse response (CIR) is modeled such that the signals from each of the transmitting wireless devices is received with the same signal strength. The curve 906 shows a scenario in which the CIR is modeled such that the desired signal is received with a slightly greater signal strength than the interfering signals.

As illustrated in FIG. 9, both the curve 904 and the curve 906 demonstrate significant interference, even at high SNR.

FIG. 10 shows a chart of simulation results illustrating the same system as FIG. 9, but with burst start randomization. The curves 902, 904, and 906 from FIG. 9 are shown in FIG. 10, as well, for comparison. As in FIG. 9, these curves represent simulation results without burst start randomization. Each of the curves 1004, 1006, and 1008 shows the packet error rate at a receiver attempting to receive a signal from one transmitting wireless device within a system including 8 transmitting wireless devices having different timing, but with each of the 8 transmitting wireless devices implementing burst start randomization. Specifically, the curve 1004 shows a scenario in which the CIR is modeled such that the signals from each of the transmitting wireless devices is received with the same signal strength. The curve 1006 shows a scenario in which the CIR is modeled such that the desired signal is received with a slightly greater signal strength than the interfering signals. The curve 1008 shows a scenario in which the CIR is modeled such that the various interfering signals are received with differing signal strengths.

As illustrated in FIG. 10, the curve 1004 reflects significantly lower packet error rates than the curve 904 within the same channel model, particularly at high SNR values. Similarly, the curve 1006 reflects significantly lower packet error rates than the curve 906 within the same channel model. This illustrates improvements that may be realized by implementing burst start randomization.

Figure 11:
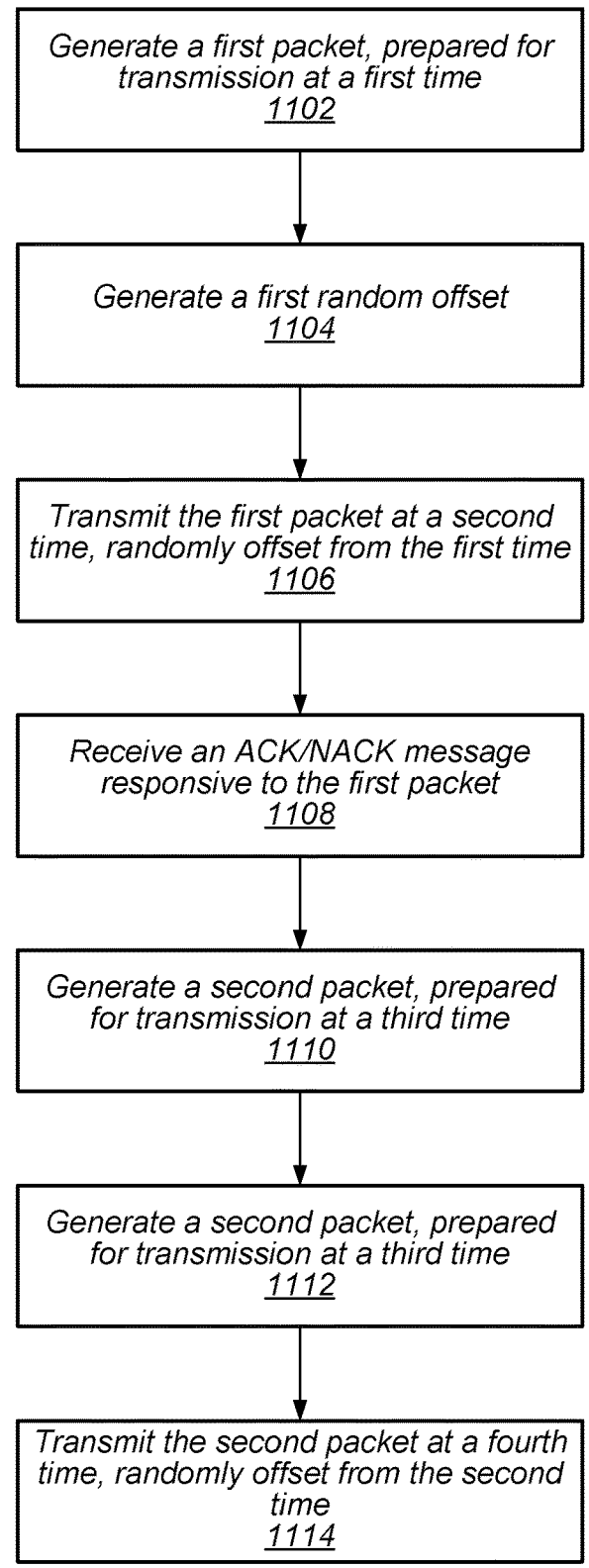
FIG. 11 shows a flow chart of an example implementation of packet start randomization, according to various exemplary embodiments described herein.

FIGS. 11-12—Packet Start Randomization

In some applications, PHY frames may be transmitted regularly with a high duty-cycle. For example, if UWB communication is utilized for audio streaming, a payload packet (e.g., an audio packet) may arrive at the PHY for transmission at regular intervals, e.g., 500 µs intervals.

In some applications, a high degree of multiuser interference may be expected when a plurality of wireless devices each perform such regular, high-duty-cycle communications. For example, a local environment may include a dense population of users simultaneously utilizing UWB communications for audio streaming between a respective media device (e.g., the user's smartphone) and the respective user's wireless headphones. Because the audio packets are generated regularly, according to a common technology, each wireless device may transmit frames with the same periodicity, e.g., 500 µs. As a result, any overlap between a first frame transmitted by a first wireless device and a second frame transmitted by a second wireless device (e.g., if the two frames overlap such that their bursts coincide in time), may be repeated for subsequent frames. For example, if the first wireless device transmits the first frame, followed by a third frame 500 µs later, and the second wireless device transmits the second frame, followed by a fourth frame 500 µs later, then the third frame will overlap with the fourth frame in exactly the same manner that the first frame overlapped with the second frame. Thus, a similar level of multiuser interference may be observed on every frame, which may be extremely detrimental if that level of user interference is particularly high.

A similar problem may occur in connection with ACK/NACK messages, regardless of whether a communication has a high degree of regularity. For example, if a first message transmitted by a first wireless device overlaps with a second message transmitted by a second wireless device, such that a high degree of multiuser interference results, then both messages may fail to be received by their respective target receivers. In response, each of the target receivers may transmit a NACK message, or other message indicating that the message was not successfully received. In response to the respective NACK messages, the first wireless device may transmit a third frame including a retransmission of the payload of the first frame, and the second wireless device may transmit a fourth frame including a retransmission of the payload of the second frame. Because the first wireless device and the second wireless device are using the same communications technology, the time delay required to receive a NACK and retransmit may be the same for both devices. Thus, the third frame will overlap with the fourth frame in exactly the same manner that the first frame overlapped with the second frame. Thus, the third frame and the fourth frame may also fail. Further retransmissions may suffer from the same problem.

To this end, transmission of an UWB frame transmitted by a first wireless device may be delayed so as to prevent a significant number of frames from having the same offset relative to respective frames transmitted by a second wireless device.

FIG. 11 shows a flow chart for a procedure to accomplish this goal when transmitting a series of frames, by randomizing packet start times, according to some embodiments. The procedure of FIG. 11 may be performed by a wireless communication device, e.g., such as the wireless device 102 (e.g., as may be further defined by the wireless device 200 and/or the wireless device 300). The wireless device 102 may be referred to as the transmitting wireless device 102.

At 1102, the transmitting wireless device 102 may generate a first packet. The first packet may refer to either a payload packet (e.g., a MAC packet or an audio packet) or may refer to a PHY packet (e.g., a PPDU). For example, the packet may include a frame as illustrated in FIG. 4 or a payload packet encoded as a part thereof, such as the PSDU. The first packet may be prepared for transmission at a first time. For example, the first packet may be saved in a memory, register, buffer, etc., and may be in a completed state, such that it is ready to be transmitted. The first time may represent the earliest time at which the first packet is in such a state that the wireless device is capable of transmitting it.

At 1104, the transmitting wireless device 102 may generate a first offset, which may be a value representing a number of time units of any convenient size or form, such as seconds (or portions thereof), clock cycles, symbols (or portions thereof), etc. In some scenarios, the first offset may be generated as a random offset (to include a "pseudorandom offset). In some scenarios, the first offset may be generated in any manner that allows the offset to be known to both the transmitter and the receiver. In other scenarios, the first offset may be known only to the transmitter. For example, in some scenarios, generating the first offset may include executing an algorithm known to the transmitting wireless device 102 and possibly also known to a remote receiving wireless device, such as the wireless device 104 of FIG. 1, to calculate an offset—e.g., a pseudorandom offset. In some scenarios, generating the first offset may include selecting a value from (or generating a value based on) a set of values known to the transmitting wireless device 102 and possibly also known to the receiving wireless device 104. For example, the set of values may be a set of values stored by the wireless devices for some other purpose, such as, e.g., a scramble sequence defined by an applicable communications standard, such as 802.15.4.

At 1106, the transmitting wireless device 102 may transmit the first packet at a second time. The second time may follow the first time by the amount of time identified by the first offset. In this way, transmission of the first packet may be offset (e.g., randomly) in time relative to the first time.

At 1108, the transmitting wireless device 102 may receive from the receiving wireless device 104 a message indicating whether the first packet was successfully received. For example, the message may include an ACK message (or other message) indicating successful receipt of the first packet or a NACK message (or other message) indicating that receipt of the first packet was unsuccessful.

At 1110, the transmitting wireless device 102 may generate a second packet. The second packet may be similar in form to the first packet. The second packet may be prepared for transmission at a third time. For example, the second packet may be saved in a memory, register, buffer, etc., and may be in a completed state, such that it is ready to be transmitted. The third time may represent the earliest time at which the second packet is in such a state that the wireless device is capable of transmitting it.

In some scenarios, generation of the second packet may be responsive to, or influenced by, the message received at 1108. For example, if the message received at 1108 includes a NACK message, then the transmitting wireless device may, in response, determine to retransmit the first packet or a payload portion thereof. Therefore, in such scenarios, the second packet may be or include the first packet or a payload portion thereof. For example, generating the second packet may include generating a copy of the first packet for retransmission.

As another example, if the message received at 1108 includes an ACK message, then the transmitting wireless device may, in response, determine not to retransmit the first packet or a payload portion thereof, and/or may decide to transmit a different packet. Therefore, in such scenarios, generating the second packet may include generating an entirely new packet, such as a new payload packet (e.g., MAC packet or audio packet).

At 1112, the transmitting wireless device 102 may generate a second offset. The second offset may be generated in a same or similar manner as the first offset, and may be of a same or similar form. The second offset may be different than, or independent of, the first offset.

At 1114, the transmitting wireless device 102 may transmit the second packet at a fourth time. The fourth time may follow the third time by the amount of time identified by the second offset. In this way, transmission of the second packet may be offset (e.g., randomly) in time relative to the third time. Further, transmission of the second packet may be offset in time relative to transmission of the first packet. Thus, if another wireless device is concurrently transmitting packets at intervals foreseeably similar to the interval between the first time and the third time, it is unlikely that those packets will overlap both the first packet and the second packet to the same extent.

It should be appreciated that various steps of the procedure of FIG. 11 may be performed in different order or may be omitted. For example, the first offset may be generated before or after generation of the first packet, such that 1102 and 1104 may be reversed in order. Similarly, the second offset may be generated before or after generation of the second packet, such that 1112 may occur at any point prior to 1114. As another example, in some scenarios, 1108 may be omitted. As yet another example, in some scenarios, the transmitting wireless device 102 may transmit only a single packet, such that 1110-1114 may be omitted.

Each offset may be effectively any value. However, as the goal of delaying transmission by an offset is to shift bursts of the packet so as to align randomly with bursts of any other packet concurrently transmitted by another device, the effect of the delay may be cyclic with a period of one symbol length. Thus, in some scenarios, an offset (e.g., the first offset and/or the second offset) may have a value not greater than (e.g., less than) a symbol length of the packet (e.g., a data symbol length). In other scenarios, the offsets may have a higher or lower maximum value. As can be seen from FIG. 6, an offset of even one chip may have a significant effect on the multiuser interference between two overlapping frames.

In some scenarios, offsetting transmission start time of a packet may include offsetting transmission start time of an entire frame. In other scenarios, e.g., where the packet is a payload packet, offsetting transmission start time of the packet may include initiating transmission of the frame without offset, but offsetting a start time of the packet within the frame.

In some scenarios, a frame may include more than one packet. In such scenarios, both packets may be offset by a single offset, or each packet may be offset within the frame by a different, or independent, offset.

It should be noted that the first offset and the second offset are distinct from backoff times as known in the art, and are not a part of a backoff procedure. For example, the transmitting wireless device 102 may, in some scenarios, not perform a carrier-sense multiple access (CSMA) procedure (e.g., as known in the art) and/or an enhanced distributed channel access (EDCA) procedure (e.g., as known in the art) at any of the first time, the second time, the third time, and/or the fourth time. In some scenarios, the transmitting wireless device 102 does not perform a CSMA and/or EDCA procedure at any time. More generally, the transmitting wireless device 102 may not perform any procedure to determine whether the transmission medium is occupied or available before transmitting.

In other scenarios, the transmitting wireless device 102 may perform one or more procedures (e.g., CSMA/EDCA procedures) to determine whether the transmission medium is occupied or available before transmitting, and may implement any of various collision avoidance (CA) schemes, e.g., as known in the art, such as use of backoff counters. Further, the packet start randomization procedure of FIG. 11 may then be implemented when (e.g., in response to) the medium is found to be available (e.g., unoccupied). For example, within the context of the procedure of FIG. 11, the first packet may, in some scenarios, be considered to be prepared for transmission only once a CSMA-CA or EDCA scheme determines that the first packet may be transmitted, e.g., because the medium is available. Thus, the first time defined at 1102 may be considered to be the time at which the CSMA-CA/EDCA scheme determines that the first packet may be transmitted, e.g., after any applicable backoff period. In keeping with 1106, transmission of the packet may then be further delayed by the first offset. In this manner, the packet start randomization procedure of FIG. 11 may provide additional protection against so-called "hidden terminal" problems.

It should be appreciated that the packet start randomization procedure of FIG. 11 may be used in conjunction with the burst start randomization procedure of FIG. 7. Either or both procedures may also be used in conjunction with other methods of reducing and/or overcoming multiuser interference, such as CSMA-CA/EDCA, retransmission, etc.

Although the devices, systems, and methods described herein have been described with reference to UWB communications, it should be appreciated that they are equally applicable to any pulse-based communication technology or protocol. Reference to UWB communications or protocols is not intended to be limiting.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a device (e.g., a wireless device 102 or 104) may include means for performing each step of a method, e.g., any of the method embodiments described herein, or, any combination of the method embodiments described herein, or, any subset of any of the method embodiments described herein, or, any combination of such subsets.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a wireless device 102 or 104) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
by a wireless communication device:
generating a frame comprising a plurality of data bursts, wherein each data burst of the plurality of data bursts is associated with a respective nominal transmission window followed by a respective nominal guard window;
for each data burst of the plurality of data bursts, generating a respective random offset time having a value not greater than the length of the respective guard window; and
transmitting the frame to a receiving device, wherein each data burst of the plurality of data bursts is transmitted at a time offset by the respective offset time from the start of the respective nominal transmission window, such that transmission of the data burst is completed during the respective guard window.

2. The method of claim 1, wherein the respective random offset time is known to the receiving device.

3. The method of claim 1, wherein, for each data burst of the plurality of data bursts, the respective random offset time has a value not greater than a predetermined fraction of the respective guard window.

4. The method of claim 1, wherein generating the respective random offset comprises executing a pseudorandom number generation algorithm known to both the wireless communication device and the receiving device.

5. The method of claim 1, wherein generating the respective random offset comprises selecting a value from a sequence of values known to both the wireless communication device and the receiving device.

6. The method of claim 5, wherein the sequence of values comprises a sequence defined by a communication protocol implemented by the wireless communication device.

7. A wireless communication device comprising:
at least one antenna; and
communication circuitry coupled to the at least one antenna and configured to:
encode first payload data as a first burst of pulses within a first symbol comprising a nominal transmit time window followed by a nominal guard time window;
generate a first random offset time having a value no greater than the length of the nominal guard time window; and
transmit the first symbol, wherein transmitting the first symbol comprises transmitting the first burst of pulses at a time that is offset by the first random offset time from a start time of the nominal transmit time window.

8. The wireless communication device of claim 7, wherein the communication circuitry is further configured to:
encode second payload data as a second burst of pulses within a second symbol comprising a nominal transmit time window followed by a nominal guard time window;
generate a second random offset time having a value no greater than the length of the nominal guard time window of the second symbol, wherein the value of the second random offset time is independent from the value of the first random offset time; and
transmit the second symbol, the second symbol immediately following the first symbol, wherein transmitting the second symbol comprises transmitting the second burst of pulses at a time that is offset by the second random offset time from a start time of the nominal transmit time window of the second symbol.

9. The wireless communication device of claim 7, wherein the communication circuitry is further configured to:
transmit a frame comprising a plurality of symbols, the plurality of symbols comprising the first symbol, wherein each symbol of the plurality of symbols comprises a respective nominal transmit time window followed by a respective nominal guard time window, wherein each symbol comprises a respective burst of pulses offset from the respective nominal transmit time window by a respective random offset time.

10. The wireless communication device of claim 7, wherein the first burst of pulses occupies a portion of the nominal guard time window of the first symbol as a result of the offset.

11. The wireless communication device of claim 7, wherein the first random offset time has a value no greater than a predetermined fraction of the length of the nominal guard time window.

12. A method comprising:
by a wireless communication device:
  generating a first packet comprising a plurality of data bursts, wherein each data burst of the plurality of data bursts is associated with a respective nominal transmission window followed by a respective nominal guard window, such that the generated first packet is prepared for transmission at a first time;
  generating a first random offset; and
  transmitting the first packet at a second time that is after the first time by the first random offset, such that transmitting the first packet concludes within the nominal guard window, wherein transmitting the first packet at the second time randomizes overlap of the data bursts of the first packet with data bursts of a concurrent packet transmitted by another device.

13. The method of claim 12, further comprising:
generating a second packet, such that the generated second packet is prepared for transmission at a third time;
generating a second random offset that is independent from the first random offset; and
transmitting the second packet at a fourth time that is after the third time by the second random offset.

14. The method of claim 13, further comprising:
receiving a notification that the first packet was not successfully received, wherein generating the second packet comprises generating a copy of the first packet for retransmission.

15. The method of claim 12, further comprising:
generating a periodic series of packets at regular intervals, wherein the first packet is comprised in the periodic series of packets.

16. The method of claim 15, further comprising:
transmitting each packet in the periodic series of packets at a respective time that is delayed by a respective random offset following generation of the packet.

17. The method of claim 15, wherein the periodic series of packets comprises audio packets.

18. The method of claim 12, wherein the first random offset has a value no greater than one symbol length.

19. The method of claim 12, wherein the wireless communication device performs the transmitting the first packet at the second time without performing a carrier-sense multiple access (CSMA) procedure.

20. The method of claim 12, wherein transmitting the first packet comprises:
  for each data burst of the plurality of data bursts, generating a respective random offset time having a value no greater than the length of the respective guard window; and
  transmitting the first packet, wherein each data burst of the plurality of data bursts is transmitted at a time offset by the respective offset time from the start of the respective nominal transmission window, such that transmission of the data burst is completed during the respective guard window.

* * * * *